(12) United States Patent
Slevin et al.

(10) Patent No.: US 10,487,201 B2
(45) Date of Patent: Nov. 26, 2019

(54) CABLE SHEATHING COMPOSITION

(71) Applicants: AEI Compounds Ltd., Sandwich, Kent (GB); SACO AEI Polymers, Inc., Sheboygan, WI (US)

(72) Inventors: Mike Edward Slevin, Chartham (GB); David Geraint Roberts, Sheboygan Falls, WI (US)

(73) Assignees: AEI Compounds Ltd., Sandwich (GB); SACO AEI Polymers, Inc., Sheboygan, WI (US)

(*) Notice: Subject to any disclaimer, the term of this patent is extended or adjusted under 35 U.S.C. 154(b) by 111 days.

(21) Appl. No.: 15/903,654

(22) Filed: Feb. 23, 2018

(65) Prior Publication Data
US 2018/0251629 A1  Sep. 6, 2018

Related U.S. Application Data

(60) Provisional application No. 62/465,460, filed on Mar. 1, 2017.

(51) Int. Cl.
| C08L 23/08 | (2006.01) |
| C08L 31/04 | (2006.01) |
| H01B 7/295 | (2006.01) |
| C08K 3/22  | (2006.01) |

(52) U.S. Cl.
CPC .......... C08L 23/0853 (2013.01); C08L 31/04 (2013.01); H01B 7/295 (2013.01); C08K 2003/2224 (2013.01); C08L 2201/02 (2013.01); C08L 2203/202 (2013.01); C08L 2205/025 (2013.01); C08L 2205/03 (2013.01); C08L 2205/035 (2013.01)

(58) Field of Classification Search
CPC ......... C08K 2003/2224; C08L 23/0853; C08L 31/04; C08L 2003/2224; C08L 2203/202; C08L 2205/025; C08L 2205/035
See application file for complete search history.

(56) References Cited

U.S. PATENT DOCUMENTS

| 4,732,939 A | 3/1988 | Hoshi et al. |
| 4,921,916 A | 4/1990 | Howell et al. |
| 4,941,729 A | 7/1990 | Hardin et al. |
| 5,112,919 A | 5/1992 | Furrer et al. |
| 5,194,184 A | 3/1993 | Takeyama et al. |
| 5,284,889 A | 2/1994 | Pyun et al. |
| 5,312,861 A | 5/1994 | Meverden et al. |
| 5,401,787 A | 5/1995 | Tonyali |
| 5,474,602 A | 12/1995 | Brown et al. |
| 5,883,144 A | 3/1999 | Bambara et al. |
| 5,889,087 A | 3/1999 | Hayashi et al. |
| 5,986,028 A | 11/1999 | Lai et al. |
| 6,025,424 A | 2/2000 | Katsuki et al. |
| 6,043,728 A | 3/2000 | Ida et al. |
| 6,495,760 B1 | 12/2002 | Castellani et al. |
| 6,552,112 B1 | 4/2003 | Redondo et al. |
| 6,676,920 B1 | 1/2004 | Oishi et al. |
| 6,703,435 B2 | 3/2004 | Barioz |
| 6,750,282 B1 | 6/2004 | Schall et al. |
| 6,864,323 B2 | 3/2005 | Schlosser et al. |
| 6,894,101 B2 | 5/2005 | Paul et al. |
| 6,924,031 B2 | 8/2005 | Grizante Redondo et al. |
| 6,951,896 B2 | 10/2005 | Ottenheijm |
| 7,196,130 B2 | 3/2007 | Uehara et al. |
| 7,221,841 B2 | 5/2007 | Chase et al. |
| 7,232,856 B1 | 6/2007 | Campbell et al. |
| 7,304,245 B2 | 12/2007 | Alexander et al. |
| 7,652,090 B2 | 1/2010 | Alexander et al. |
| 7,902,273 B2 | 3/2011 | Kambe |
| 7,943,694 B2 | 5/2011 | Varnhorn et al. |
| 8,129,619 B2 | 3/2012 | Moriuchi et al. |
| 8,494,326 B2 | 7/2013 | Consonni et al. |
| 8,525,028 B2 | 9/2013 | Cree et al. |
| 8,703,288 B2 | 4/2014 | Clancy |
| 8,895,857 B2 | 11/2014 | Shiraki et al. |
| 9,318,240 B2 | 4/2016 | Yan et al. |
| 2003/0114604 A1 | 6/2003 | Schlosser et al. |
| 2003/0134969 A1 | 7/2003 | Schlosser et al. |
| 2005/0131129 A1 | 6/2005 | Uehara et al. |
| 2008/0311328 A1 | 12/2008 | Kimura |
| 2009/0238957 A1* | 9/2009 | Clancy .................. C08L 23/02 427/117 |

(Continued)

FOREIGN PATENT DOCUMENTS

| CN | 101475716 | 7/2009 |
| CN | 102585322 | 7/2012 |

(Continued)

OTHER PUBLICATIONS

Azizi, H. et al., Silane crosslinking of polyethylene: The effects of EVA, ATH and Sb2O3 on properties of the production of continuous grafting of LDPE, eXPRESS Polymers Letters 1(6), pp. 378-384, Jun. 2007.

Baillet, C. et al., The Combustion of Polyolefins Filled with Metallic Hydroxides and Antimony Trioxide, Polymer Degradation and Stability, 30, pp. 89-99, 1990 Elsevier Science Publishers Ltd., England.

English Abstract of CN 101508806 A, published Aug. 19, 2009, Shanghai Electrical Cable Research Institute, 1 pp.

Gilman et al., "Nanocomposites: A Revolutionary New Flame Retardant Approach," SAMPE Journal, vol. 33 No. 4, 1997, pp. 40-46.

International Search Report and Written Opinion for PCT/IB2016/05694, dated Oct. 24, 2016, 8 pages.

(Continued)

*Primary Examiner* — Edward J Cain
(74) *Attorney, Agent, or Firm* — Foley & Lardner LLP

(57) ABSTRACT

Polymer composites, which are commonly for use as sheathing materials in wire and cable applications, are provided. The sheathing materials exhibit flame retardant properties and include a polymeric blend, which includes olefin/unsaturated ester copolymer and olefin (co)polymer, a hydrated metal oxide flame-retardant, such as magnesium hydroxide, and an antimony compound.

22 Claims, No Drawings

(56) References Cited

U.S. PATENT DOCUMENTS

| | | |
|---|---|---|
| 2010/0209705 A1 | 8/2010 | Lin et al. |
| 2010/0282489 A1 | 11/2010 | Cree et al. |
| 2011/0056728 A1 | 3/2011 | Shiraki et al. |
| 2016/0260524 A1 | 9/2016 | Clancy et al. |
| 2017/0233564 A1 | 8/2017 | Li et al. |

FOREIGN PATENT DOCUMENTS

| | | |
|---|---|---|
| EP | 0245938 A2 | 11/1987 |
| EP | 0365289 A2 | 4/1990 |
| EP | 1 116 244 B1 | 12/2002 |
| EP | 1 524 294 A1 | 4/2005 |
| WO | WO-00/19452 A1 | 4/2000 |
| WO | WO-2009/042387 A1 | 4/2009 |
| WO | WO-2009/097410 A1 | 8/2009 |

OTHER PUBLICATIONS

Stryczek et al., New Low Smoke Zero Halogen Tray Cable Jacket Materials designed for Balance of Cost, Performance and Enhanced Fire Resistance, Proceedings of the 63rd International Wire & Cable Symposium, pp. 713-717 (Feb. 2015); http://assets.conferencespot.org/fileserver/file/322619/filename/089_P-22.pdf.

International Search Report and Written Opinion regarding International Appl. No. PCT/US2018/019428, dated May 24, 2018, 16 pages.

* cited by examiner

CABLE SHEATHING COMPOSITION

CROSS-REFERENCE TO RELATED APPLICATIONS

This application claims priority to U.S. Provisional Application Ser. No. 62/465,509, filed Mar. 1, 2017, the content of which is incorporated by reference herein in its entirety.

BACKGROUND

Cable insulation and sheathing materials are used in the wire and cable industry to provide protection and insulation of electrical conductors. Such materials must satisfy a complicated variety electrical, mechanical performance and fire requirements, which depend on the particular type of environment the material is designed for use in.

In recent years, the use of a halogenated materials, such as bromine or chlorine substituted materials, has been limited in many countries. Gases evolved during burning such materials can be corrosive, toxic, harmful & generate dense smoke obscuring escape in fire situations. The potential advantages of halogen-free cables may include reduced environmental and corrosive impact, as well as a potential reduction in smoke and/or toxic gas generation.

There is continuing a need to produce cable insulation and sheathing materials that are substantially free of halogen-containing compounds, while maintaining the necessary flame retardant and other physical attributes of the cable insulation materials.

SUMMARY

The present application relates generally to the field of materials which can be used as sheathing materials in wire and cable applications. The sheathing materials include a polymeric blend, which includes olefin/unsaturated ester copolymer and olefin (co)polymer, a hydrated metal oxide flame-retardant and an antimony compound. The composites typically include a metal hydroxide flame retardant, such as a magnesium, calcium, zinc and/or aluminum hydroxide, together with the antimony compound.

In one embodiment, the present sheathing material is a halogen-free polymer composite, which includes (A) 100 parts by weight polymer material, which includes olefin/unsaturated ester copolymer, such as an ethylene/vinyl acetate copolymer, and olefin (co)polymer, such as ethylene/α-olefin copolymer and/or olefin block copolymer; (B) about 75 to 175 parts by weight hydrated metal oxide flame-retardant; and (C) about 40 to 100 parts by weight antimony compound. In some instances, the polymer material may also include an acid-modified polyolefin. For example, the polymer composite may include 100 parts by weight of the polymer material, which includes about 50 to 65 wt % ethylene/vinyl acetate copolymer, about 10 to 20 wt % ethylene/α-olefin copolymer, and about 15 to 25 wt % olefin block copolymer; about 90 to 175 parts by weight magnesium hydroxide; and about 40 to 100 parts by weight antimony compound. In such a polymer composite, the polymer material may often also include about 5 to 15 wt % of an acid-modified polyolefin. In some instances, the polymer composite may include 100 parts by weight of the polymer material, which includes about 50 to 65 wt % ethylene/vinyl acetate copolymer, about 10 to 20 wt % ethylene/α-octene copolymer, about 15 to 25 wt % ethylene/α-olefin-polyethylene block copolymer and about 5 to 15 wt % acid-modified ethylene/α-olefin copolymer; about 125 to 175 parts by weight magnesium hydroxide; and about 40 to 80 parts by weight antimony compound.

In another embodiment, the present sheathing material is a halogen free polymer composition which includes about 15 to 25 wt % olefin/unsaturated ester copolymer; about 5 to 15 wt % polyolefin; about 35 to 55% by weight of a hydrated metal oxide flame-retardant; and about 15 to 30 wt % antimony compound. In some instances, the polymer composition may also include an acid-modified polyolefin. For example, the polymer composite may include about 15 to 25 wt % ethylene/vinyl acetate copolymer; about 3 to 10 wt % ethylene/α-olefin copolymer; about 5 to 10 wt % olefin block copolymer; about 35 to 55% by weight hydrated magnesium oxide; and about 15 to 30 wt % antimony compound. The polymer composite may also include about 1 to 5 wt % acid-modified polyolefin. Quite commonly, the total amount of polymeric material makes up about 25 to 40 wt % of the composition.

DETAILED DESCRIPTION

The present application provides halogen-free sheathing compositions, which typically exhibit excellent electrical and physical properties. The halogen-free sheathing materials may be used in wire and cable applications. The sheathing material includes a polymer material, an antimony compound and an inorganic flame retardant, such as a hydrated metal oxide flame-retardant. The halogen-free sheathing composition typically includes about 90 to about 175 parts by weight of the hydrated metal oxide flame retardant and about 40 to about 100 parts by weight of the antimony compound per 100 parts by weight of a thermoplastic polymer material. Typically, the thermoplastic polymer material may include a blend of olefin/unsaturated ester copolymer, e.g., ethylene/vinyl acetate copolymer, and olefin (co)polymer, e.g., a mixture of ethylene/α-olefin plastomer, olefin block copolymer (e.g., ethylene/α-olefin-polyethylene block copolymer) and/or an acid-modified polyolefin.

The flame retardant material includes hydrated metal oxide flame retardant, such as a magnesium, calcium, zinc and/or aluminum hydroxide. The flame retardant material typically includes hydrated magnesium oxide (e.g., magnesium dihydroxide) and/or aluminum hydroxide (e.g., aluminum monohydrate and/or aluminum trihydrate), which commonly has an average particle size no more than about 3 microns. For example, the flame retardant material may include magnesium hydroxide, such as a precipitated magnesium dihydroxide (MDH) having an average particle size of no more than about 2 microns. In some embodiments, the magnesium dihydroxide may be in the form of hexagonal platelets having average particle size of about 0.8-2 microns. In many instances, the hydrated magnesium oxide may include magnesium dihydroxide in the form of ground brucite. In some embodiments, it may be advantageous to use silane-coated particulate magnesium dihydroxide, e.g., precipitated magnesium dihydroxide having a silane coating. Quite commonly, the present sheathing compositions include about 75 to 175 parts by weight of the hydrated metal oxide flame retardant, e.g., hydrated magnesium oxide, per 100 parts by weight of polymer material.

In some embodiments, it may be advantageous for the flame retardant material to include a surface treated hydrated metal oxide flame-retardant. For example, the flame retardant material may include hydrated metal oxide which has been surface treated with an organosilane, e.g., magnesium dihydroxide, aluminum monohydrate and/or aluminum trihydrate which has been surface treated with a vinyl silane and/or an oligomeric vinyl silane. Suitable vinyl silanes include vinyl trialkoxysilanes, e.g., vinyl trimethoxysilane (VTMOS) and/or vinyl triethoxysilane (VTEOS). Suitable oligomeric vinyl silanes include an oligomer of an alkyltrialkoxy silane (e.g., butyltriethoxy silane, propyltriethoxy silane, propyltrimethoxy silane and/or butyltrimethoxy silane) and a vinyl trialkoxysilane. Such oligomers typically have an effective vinyl content of about 5 to 25 wt. %.

The antimony compound may include antimony trioxide, antimony pentoxide, antimony tetroxide, sodium antimonate and/or antimony tartrate. Typically, the antimony compound includes antimony trioxide. The antimony compound may be in granular form, e.g., as pellets or as microgranules, containing a thermoplastic polymer with very high concentration of antimony compound (e.g., up to 90% antimony trioxide). Such products may be referred to as a "masterbatch" of an antimony compound, e.g., a dispersion of particles of the antimony compound in a polymeric support. Suitable examples include granular materials containing up to about 80% antimony trioxide compounded with EVA and granular materials containing about 80-90% antimony trioxide compounded with polyethylene. Quite commonly, the present sheathing compositions include about 40 to 100 parts by weight antimony compound per 100 parts by weight of polymer material.

The ethylene/vinyl acetate (EVA) copolymer may be a random ethylene/vinyl acetate copolymer. The ethylene/vinyl acetate copolymer may suitably have a vinyl acetate monomer content of about 15-30%. Such ethylene/vinyl acetate copolymers may have a melt flow index (WI as determined pursuant to ISO 1133) of about 1-5 g/10 min (@ 190° C.) and a density of about 0.94-0.96 g/cm$^3$. Such EVA copolymers may suitably have a Vicat softening point of about 40-55° C. (as determined pursuant to ISO 306) and/or a melting point of about 65-85° C. (as determined via DSC pursuant to ISO 3146).

The ethylene/α-olefin copolymer may commonly include an ethylene/α-olefin plastomer, such as an ethylene/α-octene plastomer. A suitable ethylene/α-octene plastomer may have an ultimate tensile elongation of at least about 600% (as determined pursuant to ASTM D628) and an ultimate tensile strength of at least about 5 MPa (725 psi) (as determined pursuant to ASTM D628). Such an ethylene/α-octene plastomer may have a melt index (as determined pursuant to ASTM D1238) of about 1-10 g/10 min (2.16 kg@190° C.) and/or a melting point of about 50-90° C. (as determined via DSC pursuant to ASTM D 3418).

The olefin block copolymer may suitably include an ethylene/α-olefin-polyethylene block copolymer (e.g., an ethylene/α-octene-polyethylene block copolymer). Suitable ethylene/α-olefin-polyethylene block copolymers may have an elongation at break of at least about 1,200% (as determined pursuant to ASTM D628) and a tensile strength at break of at least about 2 MPa (300 psi) (as determined pursuant to ASTM D628). Such ethylene/α-olefin-polyethylene block copolymers may have a melt index (as determined pursuant to ASTM D1238) of about 10-20 g/10 min (2.16 kg @ 190° C.) and/or a surface hardness (Shore A) of about 60-80 (as determined pursuant to ASTM D2240). Typically, suitable ethylene/α-olefin-polyethylene block copolymers may have a melting point of about 115-125° C. (as determined via DSC pursuant to ASTM D3418). In some embodiments, the olefin block copolymer may include an ethylene/α-octene-HDPE block copolymer.

The acid-modified polyolefin may commonly include maleic acid graft-modified polyolefin, such as a maleic acid graft-modified ethylene/propene copolymer. Suitable maleic acid graft-modified ethylene/propene copolymers may have an elongation at break of at least about 800% (as determined pursuant to ASTM D628) and a tensile strength at break of at least about 5 MPa (725 psi) (as determined pursuant to ASTM D628). Such graft-modified ethylene/propene copolymers may have a melt flow rate (as determined pursuant to ASTM D1238) of about 0.1-3 g/10 min (2.16 kg @ 190° C.) and/or a surface hardness (Shore A) of about 60-80 (as determined pursuant to ASTM D2240).

The present polymer composites may suitably contain a number of optional ingredients. For example, the composites may include anti-oxidant(s), a UV protector/light stabilizer, colorant, chalk and/or optional processing aids, such as an UHMW silicone, which may be dispersed in a thermoplastic polyolefin.

The sheathing materials may desirably be a crosslinkable, halogen-free polymer composite. The present composites may be designed to be crosslinked by a conventional method known to those of skill in the art. Common crosslinking methods include moisture-cure methods, free radical cure methods and irradiation based methods (e.g., electron beam methods). In some embodiments, the polymer composite includes a co-agent additive(s) to promote radiation curing, such as a co-agent additive containing two or three or more unsaturated carbon-carbon functional groups. Suitable examples include triallyl cyanurate (TAC), trimethylolpropane trimethacrylate (TMPTA), trimethylolpropane triacrylate, and triallyl trimethylolpropane.

In applications where a moisture-curable sheathing material is desired, the composition typically includes a moisture-curable thermoplastic polymer together with the flame retardant material. Such a crosslinkable thermoplastic polymer is desirably curable by exposure to moisture, e.g., by the inclusion of moisture curable silane functionality in the thermoplastic polymer, such as by including a silane grafted polymer in an crosslinkable thermoplastic polymer blend. This may be accomplished by grafting silane functional groups onto one or more thermoplastic polymers in the composite. For example, a crosslinkable thermoplastic polymer blend may include EVA copolymer, ethylene copolymer plastomer and/or a thermoplastic olefin block copolymer, which have been grafted with silane functional groups, e.g., through free radical initiated reaction with a vinyl alkoxysilane, such as a vinyltrialkoxysilane. In some instances, the crosslinkable thermoplastic polymer blend may also include unmodified EVA copolymer, ethylene/α-octene plastomer, ethylene/α-olefin-polyethylene block copolymer and/or acid-modified ethylene/α-olefin copolymer.

In some embodiments, the polymer composition may be a moisture curable, halogen-free polymer composite which includes a polymer component, an antimony compound and a metal hydroxide flame retardant. The metal hydroxide flame retardant typically includes magnesium hydroxide and/or aluminum hydroxide. The polymer component may include one or more of a silane-grafted olefin/unsaturated ester copolymer, such as a silane-grafted ethylene/vinyl acetate copolymer, a silane-grafted ethylene/α-olefin plastomer and a silane-grafted thermoplastic polyolefin (e.g., a silane-grafted ethylene/α-olefin-polyethylene block copolymer). Such a polymer composition may optionally include olefin/unsaturated ester copolymer, ethylene/α-olefin copolymer, ethylene/α-olefin-polyethylene block copolymer and/or acid-modified polyolefin.

The silane grafted polymer blends may be formed by combining an ethylene/vinyl acetate copolymer (EVA) with an ethylene copolymer plastomer, such as an ethylene/α- olefin plastomer and, optionally, an ethylene/α-olefin-polyethylene block copolymer. The mixture may also include other additives, such as antioxidant and/or chalk ($CaCO_3$). Vinyl silane, e.g., a vinyl trialkoxysilane such as vinyl trimethoxysilane and/or vinyl triethoxysilane, and organic peroxide (such as 1,1-di(tert-butylperoxy)-3,3,5-trimethylcyclohexane) are included in the blend. The mixture may suitably be compounded in an extruder at a temperature of about 140 to 200° C. to provide the silane grafted polymer blend. The resulting blend includes silane-grafted ethylene/vinyl acetate copolymer, silane-grafted ethylene/α-olefin plastomer and/or silane-grafted ethylene/α-olefin-polyethylene block copolymer.

The silane-grafted polymer blend may be compounded with metal hydroxide flame retardant (e.g., magnesium hydroxide and/or aluminum hydroxide) and other conventional additives and then extruded to form a halogen free, flame-retardant, crosslinkable polymer composite. This may suitably be carried out by extrusion compounding the silane-grafted polymer blend, metal hydroxide flame retardant and other conventional additives in an extruder, e.g., at a temperature of about 135 to 200° C. The crosslinkable polymer composite is typically UV stabilized and is curable by exposure to moist conditions. In use, the crosslinkable polymer composite is typically mixed with a crosslinking catalyst masterbatch, e.g., in a ratio of about 95:5 to 99:1 (commonly about 97:3).

The tables below provide illustrations of suitable formulations for producing halogen-free, flame retardant filled polymer composites according to the present application. The components listed for Polymer Blend Formulation A1 can be melt processed, e.g., via extrusion compounding, to provide Silane Grafted Polymer Blend A1. This may then be combined in the amount shown with the other ingredients listed for Flame Retardant Filled Polymer Composite Formulation HFFR-1 in a melt processing step, e.g., via extrusion compounding, to provide a polymer composite suitable for use as a sheathing material in wire and cable applications. Alternatively, both polymer blending operations and the combination of the polymer material(s) with the other ingredients of the composite may be accomplished in a single compounding operation.

Polymer Blend Formulation A1

| Component | Wt. % | Notes |
|---|---|---|
| Ethylene/α-octene plastomer | 10-20 | thermoplastic Ethylene/α-octene plastomer |
| α-Olefin block copolymer | 15-25 | ethylene/α-olefin-polyethylene block copolymer |
| EVA copolymer | 50-65 | random ethylene/vinyl acetate copolymer |
| Acid-modified polyolefin | optional 5-15 | acid-modified ethylene/α-olefin copolymer |

Flame Retardant Filled Polymer Composite Formulation HFFR-1

| Component | Wt. % | Notes |
|---|---|---|
| Polymer Blend A1 | 25-40 | Polymer blend with EVA, α-Olefin block copolymer and optional acid-modified polyolefin |
| Optional UHMW silicone | 0-2 | Typically as 50% dispersion in thermoplastic polyolefin |

| Component | Wt. % | Notes |
|---|---|---|
| Magnesium hydroxide and/or aluminum hydroxide | 35-55 | Typically average particle size no more than 2 microns |
| Antimony compound | 15-30 | Typically antimony trioxide |
| Antioxidant | 0.5-2 | |
| Optional UV Protector/Light Stabilizer | 0-1.0 | |
| Optional colorant | 0-4 | |
| Optional processing aids | 0-5 | |

In applications where a radiation-curable sheathing material is desired, the composition may include a co-agent additive(s) to promote radiation curing. For example, the sheathing material may include a co-agent additives containing two or three or more unsaturated carbon-carbon functional groups to aid in promoting crosslinking. Suitable examples include triallyl cyanurate (TAC), trimethylolpropane trimethacrylate (TMPTA), trimethylolpropane triacrylate, and/or triallyl trimethylolpropane.

In applications where a free radical-curable sheathing material is desired, the composition may include a co-agent additive(s) to promote crosslinking. For example, where the sheathing material is desired for a peroxide cure via the addition of peroxide (e.g., hydrogen peroxide or an organic peroxide, such as a benzoyl peroxide), co-agents such as a unsaturated polymer, e.g., a polymer which includes olefinic functional groups, such as a styrene/butadiene copolymer or styrene/isoprene copolymer, may be added to the sheathing material.

EXAMPLES

The following examples illustrate more specifically the present compositions according to various embodiments described above. These examples should in no way be construed as limiting the scope of the present technology.

Table 1 below provides a number of exemplary formulations for producing the present halogen-free, flame retardant filled polymer composites. The polymer components listed are typically melt processed in an initial operation, e.g., via extrusion, to provide a Polymer Blend. The Polymer Blend may then be combined in the amounts shown with the inorganic ingredients listed in a second melt processing step, e.g., via extrusion, to provide a flame retardant polymer composite.

TABLE 1

Illustrative Compositions

| Component (Wt. %) | Ex-1 | Ex-2 | Ex-3 | Ex-4 | Ex-5 | Ex-6 | Ex-7 | Ex-8 |
|---|---|---|---|---|---|---|---|---|
| EVA copolymer | 17.8 | 17.8 | 17.8 | 17.8 | 17.8 | 17.8 | 17.8 | 17.8 |
| Ethylene/α-octene | — | 4.6 | 4.6 | 4.6 | 4.6 | 4.6 | — | 4.6 |
| α-Olefin block copolymer | 10.8 | 6.2 | 6.2 | 6.2 | 6.2 | 6.2 | 10.8 | 6.2 |
| Acid-modified polyolefin | 3.0 | 3.0 | 3.0 | 3.0 | 3.0 | 3.0 | 3.0 | 3.0 |
| Total Polymer | 32.1 | 32.1 | 32.1 | 32.1 | 32.1 | 32.1 | 32.1 | 32.1 |
| Other Additives | 1.4 | 1.4 | 1.4 | 1.4 | 1.4 | 1.4 | 1.4 | 1.4 |
| MDH | 46.5 | 46.5 | 46.5 | 46.5 | 51.5 | 41.5 | 46.5 | 36.5 |
| $Sb_2O_3$ | 20 | 20 | 20 | 20 | 15 | 25 | 20 | 30 |
| Total Inorganic | 66.5 | 66.5 | 66.5 | 66.5 | 66.5 | 66.5 | 66.5 | 66.5 |

Table 2 below lists various properties of the Illustrative Compositions listed in Table 1. Unless expressly defined differently, all melt flow indexes (MFI) referred to herein can be determined at 190° C. (@ 21.6 kg) pursuant to ASTM D1238. Limiting oxygen index (LOI) values referred to herein were determined pursuant to ASTM D 2683. Low temperature brittleness (LTB) values referred to herein were determined pursuant to ASTM D 746. Elongation (%) values referred to herein can be determined pursuant to UL 2556 (Mar. 12, 2013) Clause 4.2 and ANSI/UL 1581:2011 Table 50.134. Tensile strength at break (TSB) values in psi (@ 20 IPM) referred to herein can be determined pursuant to UL 2556 (Mar. 12, 2013) Clause 4.2 and ANSI/UL 1581:2011 Table 50.134. Tensile strength at peak (TSP) values in psi (@ 20 IPM) referred to herein can be determined pursuant to UL 2556 (Mar. 12, 2013) Clause 4.2 and ANSI/UL 1581:2011 Table 50.134. The flame retardant properties of the materials described herein were determined pursuant to the VW-1 flame test described in UL 2556 (Mar. 13, 2013) clause 9.4 when tested on 14 AWG copper wire with 30 mil minimum average extruded insulation.

TABLE 2

Properties of Illustrative Compositions

| Sample # | MFI | LOI | LTB | Elong. | TSP | TSB | VW-1 |
|---|---|---|---|---|---|---|---|
| Ex-1 | 33.3 | 34 | — | 356 | 1163 | 1019 | 2P1F |
| Ex-2 | 24.1 | 45 | −39 | 297 | 1589 | 1482 | 3P |
| Ex-3 | 21.2 | 38 | — | 285 | 1408 | 1311 | 3P |
| Ex-4 | 21.2 | 39 | — | 289 | 1331 | 1212 | 3P |
| Ex-5 | 26.7 | 38 | — | 270 | 1521 | 1425 | 3P |
| Ex-6 | 24.5 | 41 | — | 295 | 1303 | 1219 | 3P |
| Ex-7 | 16.3 | 38 | — | 231 | 1582 | 1514 | 3P |
| Ex-8 | 25.9 | 40 | — | 331 | 1193 | 1115 | 3P |
| Target Spec | >15 | >32 | <−20 | >110 | | >1300 | 3P |

MFI—melt flow index (21.6 kg/190 C.);LOI—limiting oxygen index {ASTM D 2683}; LTB—low temperature brittleness {ASTM D 746};Elong.—elongation (%){UL 2558 (13 Mar. 2013) 4.2, ANSI/UL1581: 2011 Table 50.134};TSP—tensile strength at_(psi) @ 20 IPM {UL 2556 (12 Mar. 2013) Clause 4.2, ANSI/UL 1581: 2011 Table 50.134};TSB—tensile strength at break (psi) @ 20 IPM {UL 2556 (12 Mar. 2013) Clause 4.2, ANSI/UL 1581: 2011 Table 50.134};
Deform—deformation in % @ 131° C. {500 g, 14 AWG};
VW-1 - UL 2556 (12 Mar. 2013) Section 9.4 VW-1 Flame test UL 2556 on 14 AWG copper conductor with 30 mil min average insulation; UL 444 CMR UL 1666

Table 3 below lists formulations of a number of comparison halogen-free, flame retardant filled polymer composites. The listed polymer components are formed using the same methods as for the illustrative formulations listed in Table 1—melt processing the polymeric components in an an initial operation, e.g., via extrusion, to provide a Polymer Blend and subsequently combining the Polymer Blend in the amounts shown with the flame retardant ingredients listed in a second melt processing step, e.g., via extrusion, to provide the flame retardant polymer composites.

TABLE 3

Comparison Composition

| Component (Wt. %) | C-1 | C-2 | C-3 | C-4 | C-5 | C-6 |
|---|---|---|---|---|---|---|
| EVA copolymer | 18.3 | 18.5 | 17.8 | 17.8 | 17.8 | 17.8 |
| Ethylene/α-octene | 10.6 | 10.6 | 4.6 | 4.6 | 4.6 | 4.6 |
| α-Olefin block copolymer | — | — | 6.2 | 6.2 | 6.2 | 6.2 |
| Acid-modified polyolefin | 3.0 | 3.0 | 3.0 | 3.0 | 3.0 | 3.0 |
| Total Polymer | 32.4 | 32.4 | 32.1 | 32.1 | 32.1 | 32.1 |
| Other additives | 1.4 | 1.4 | 1.4 | 1.4 | 1.4 | 1.4 |
| MDH | 66.5 | 66.5 | 66.5 | 61.5 | 56.5 | 46.5 |
| $Sb_2O_3$ | — | — | — | 5 | 10 | — |
| $ZnBa_2O_4$ | — | — | — | — | — | 20 |
| Total Inorganic | 66.5 | 66.5 | 66.5 | 66.5 | 66.5 | 66.5 |

TABLE 3-continued

Comparison Composition

| Component (Wt. %) | C-7 | C-8 | C-9 | C-10 | C-11 |
|---|---|---|---|---|---|
| EVA copolymer | 14.7 | 18.5 | 17.8 | 17.8 | 18.6 |
| ethylene/α-octene | — | 10.6 | 4.6 | 4.6 | — |
| α-Olefin block copolymer | 6.1 | — | 6.2 | 6.2 | 7.2 |
| acid-modified polyolefin | 3.8 | 3.0 | 3.0 | 3.0 | 3.8 |
| Total Polymer | 25.1 | 32.4 | 32.1 | 32.1 | 30.1 |
| MDH | 68 | 66.5 | 66.5 | 66.5 | 68 |
| $Sb_2O_3$ | — | — | — | — | — |
| Paxymer | 5 | — | — | — | — |
| Total Inorganic | 73 | 66.5 | 66.5 | 66.5 | 68 |

Table 4 below lists various properties of the Comparison Compositions listed in Table 3. The properties were determined using the same methods specified for the determinations set forth in Table 2.

TABLE 4

Comparison Compositions

| Sample # | MFI | LOI | LTB | Elong. (%) | TSP (PSI) | TSB (PSI) | VW-1 |
|---|---|---|---|---|---|---|---|
| C-1 | 8.3 | 39 | −17 | 90 | 1335 | 910 | 2P1F |
| C-2 | 0.5 | 42 | −35 | 140 | 2230 | 2217 | 1P2F |
| C-3 | 2.2 | 44 | −39 | 177 | 2126 | 2093 | 2P1F |
| C-4 | 23.7 | 38 | — | 277 | 1558 | 1417 | 1P2F |
| C-5 | 17 | 40 | — | 229 | 2098 | 2016 | 1P2F |
| C-6 | — | — | — | — | — | — | 3F |
| C-7 | 0.05 | 44 | −7 | 55 | 1646 | 1461 | 2P1F |
| C-8 | 2.4 | 41 | −36 | 161 | 2045 | 1991 | 3F |
| C-9 | 3.7 | 40 | — | 270 | 1369 | 1073 | 3F |
| C-10 | 3.8 | 42 | −28 | 263 | 1328 | 989 | — |
| C-11 | 1.5 | 44 | −32 | 158 | 2165 | 2148 | 3F |

ILLUSTRATIVE EMBODIMENTS

While certain embodiments have been illustrated and described, it should be understood that changes and modifications can be made therein in accordance with ordinary skill in the art without departing from the technology in its broader aspects.

In one aspect, the present sheathing material is a halogen free polymer composite which includes (A) 100 parts by weight polymer material, which includes about 45 to 70 wt % olefin/unsaturated ester copolymer and about 25 to 55 wt % olefin (co)polymer; (B) about 90 to 175 parts by weight hydrated metal oxide flame-retardant; and (C) about 40 to 100 parts by weight antimony compound. The antimony compound may include antimony trioxide, antimony pentoxide, antimony tetroxide, sodium antimonate, and/or antimony tartrate. Typically, the antimony compound includes antimony trioxide. In some embodiments, the olefin/unsaturated ester copolymer may include an ethylene/vinyl acetate copolymer.

In some embodiments, the olefin (co)polymer includes an ethylene/α-olefin copolymer and/or olefin block copolymer. For example, the olefin (co)polymer may include an ethylene/α-olefin plastomer, such as an ethylene/α-octene plastomer. The olefin block copolymer may include an ethylene/α-olefin-polyethylene block copolymer, such as an ethylene/α-octene-HDPE block copolymer. In many embodiments, the polymeric material in the composite also includes an acid-modified polyolefin, such as an acid-modified ethylene/α-olefin copolymer.

In many embodiments, the polymer composite includes about 125 to 175 parts by weight of the hydrated metal oxide flame-retardant and about 40 to 80 parts by weight of the antimony compound. The hydrated metal oxide flame-retardant commonly includes magnesium hydroxide, e.g., a hydrated magnesium oxide having an average particle size of no more than about 2 microns. The antimony compound typically includes antimony trioxide, antimony pentoxide, antimony tetroxide, sodium antimonate, and/or antimony tartrate. In some embodiments, the sheathing material includes a combination of magnesium hydroxide and antimony trioxide. For example, the polymer composite may include about 125 to 160 parts by weight magnesium hydroxide and about 45 to 70 parts by weight antimony trioxide per 100 parts by weight of polymer material.

In some embodiments, the composition may include a co-agent additive(s) to promote radiation curing, such as a co-agent additive containing three or more unsaturated carbon-carbon functional groups. The radiation-curable co-agent may include triallyl cyanurate (TAC), trimethylolpropane trimethacrylate (TMPTA), trimethylolpropane triacrylate, and/or triallyl trimethylolpropane.

In some embodiments, the composition may include a co-agent additive(s) to promote free radical curing, such as a co-agent additive which is an unsaturated polymer, e.g., polymer which includes olefinic functional groups, such as a styrene/butadiene copolymer.

In another aspect, the present composition may be a crosslinkable, halogen-free polymer composite, which includes 100 parts by weight of a silane-grafted polymer blend, which is formed by silane-grafting a mixture which comprises an olefin/unsaturated ester copolymer and olefin (co)polymer, about 40 to 100 parts by weight antimony compound, and about 90 to 175 parts by weight of a hydrated metal oxide flame-retardant, such as magnesium hydroxide.

In another aspect, the present polymer composite includes (A) 100 parts by weight polymer material, which includes about 50 to 65 wt % ethylene/vinyl acetate copolymer, about 10 to 20 wt % ethylene/α-olefin copolymer, and about 15 to 25 wt % olefin block copolymer; (B) about 90 to 175 parts by weight magnesium hydroxide; and (C) about 40 to 100 parts by weight antimony compound. In some instances, the polymer material may include about 5 to 15 wt % acid-modified polyolefin, such as an acid-modified ethylene/α-olefin copolymer.

In another aspect, the present polymer composite includes (A) 100 parts by weight polymer material, which includes about 50 to 65 wt % ethylene/vinyl acetate copolymer, about 10 to 20 wt % ethylene/α-octene copolymer, about 15 to 25 wt % ethylene/α-olefin-polyethylene block copolymer and about 5 to 15 wt % acid-modified ethylene/α-olefin copolymer; (B) about 125 to 175 parts by weight magnesium hydroxide; and (C) about 40 to 80 parts by weight antimony compound.

In one aspect, the present sheathing material includes about 15 to 25 wt % olefin/unsaturated ester copolymer; about 5 to 15 wt % olefin (co)polymer; about 35 to 55% by weight of a hydrated metal oxide flame-retardant; and about 15 to 30 wt % antimony compound. The olefin (co)polymer may include one or more of ethylene/α-octene copolymer, ethylene/α-olefin-polyethylene block copolymer and acid-modified polyolefin, such as an acid-modified ethylene/α-olefin copolymer. Quite commonly, the total amount of polymeric material makes up about 25 to 40 wt % of the composition. In some instances, the sheathing material includes about 100 parts by weight polymeric material and at least about 40 parts by weight of the antimony compound.

In another aspect, the present polymer composite includes about 15 to 25 wt % ethylene/vinyl acetate copolymer, about 3 to 10 wt % ethylene/α-olefin copolymer, about 5 to 10 wt % olefin block copolymer, about 1 to 5 wt % acid-modified polyolefin, about 35 to 55% by weight hydrated magnesium oxide; and about 15 to 30 wt % antimony compound.

In another aspect, the present polymer composite includes about 15 to 25 wt % ethylene/vinyl acetate copolymer, about 3 to 10 wt % ethylene/α-octene copolymer, about 5 to 10 wt % ethylene/α-olefin-polyethylene block copolymer, about 1 to 5 wt % acid-modified ethylene/α-olefin copolymer, about 35 to 55% by weight of a hydrated magnesium oxide; and about 15 to 30 wt % antimony trioxide.

Sheathing materials formed from curing the flame retardant polymer composite materials described herein commonly meet one or more of the following specifications:

- sheathing material formed from the composition passes the Underwriter's Laboratory ("UL") 1581 VW-1 flame test (as determined pursuant to UL 1581 (July 2008), UL 2556 (March 2013) when tested on 14 AWG copper conductor;
- sheathing material formed from the composition passes the Vertical Tray flame test method 2 "FT4" described in UL 2556 (12 Mar. 2013) section 9.6 when tested on PE Primary, 4-pair twisted cable with 32 mil (0.8 mm) max thickness sheath,
- sheathing material formed from the composition has a tensile strength before aging of at least about 9 MPa (1300 lbf/in2) (as determined pursuant to UL 2556 (12 Mar. 2013) Clause 4.2 and UL 1581:2011 Table 50.134);
- sheathing material formed from the composition has an elongation before aging of at least about 110% and, preferably at least about 130% (as determined pursuant to UL 1277 (April 2010) Clause 12, Table 12.1 and UL 1581:2011 Table 50.134);
- sheathing material formed from the composition has a decrease in tensile strength after accelerated aging in air for 7 days at 121° C. of no more than about 25% (as determined pursuant to UL 2556 (12 Mar. 2013) Clause 4.2 and UL 1581:2011 Table 50.134);
- sheathing material formed from the composition has a decrease in elongation after accelerated aging in air for 7 days at 121° C. of no more than about 25% (as determined pursuant to UL 2556 (12 Mar. 2013) Clause 4.2 and UL 1581:2011 Table 50.134);
- a sheathing material formed from the composition exhibits no cracks or ruptures after being subjected to a cold bend test at −15° C. for 4 hours (as determined pursuant to ASTM D 746);
- sheathing material formed from the composition has a limiting oxygen index of at least about 32% (as determined pursuant to ASTM D 2683); and
- sheathing material formed from the composition has a melt flow index of at least about 15 g/10 min measured at 190° C., 21.6 kg (as determined pursuant to ASTM D 2683).

The embodiments, illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. A halogen free, polymer composite comprising
(A) 100 parts by weight polymer material, which includes
about 45 to 70 wt % olefin/unsaturated ester copolymer; and
about 25 to 55 wt % olefin block copolymer and/or ethylene/α-olefin copolymer;
(B) about 90 to 175 parts by weight hydrated magnesium oxide flame-retardant; and
(C) about 40 to 100 parts by weight antimony compound.

2. The polymer composite of claim 1, wherein the olefin/unsaturated ester copolymer comprises ethylene/vinyl acetate copolymer; and the olefin block copolymer comprises ethylene/α-olefin-polyethylene block copolymer and the ethylene/α-olefin copolymer comprises ethylene/α-octene copolymer.

3. The polymer composite of claim 1, wherein the olefin block copolymer comprises ethylene/α-olefin-polyethylene block copolymer.

4. The polymer composite of claim 1, wherein the polymer material comprises ethylene/α-octene copolymer and ethylene/α-octene-HDPE block copolymer.

5. The polymer composite of claim 1, further comprising acid-modified polyolefin.

6. The polymer composite of claim 1, wherein the polymer material further comprises about 5 to 15 wt % acid-modified ethylene/α-olefin copolymer.

7. The polymer composite of claim 1, wherein the antimony compound comprises antimony trioxide, antimony pentoxide, antimony tetroxide, sodium antimonate, and/or antimony tartrate.

8. The polymer composite of claim 7, wherein the composition comprises about 125 to 160 parts by weight magnesium hydroxide; and about 45 to 70 parts by weight antimony trioxide.

9. The polymer composite of claim 1, wherein the polymer material comprises about 50 to 65 wt % ethylene/vinyl acetate copolymer;
about 10 to 20 wt % ethylene/α-octene copolymer;
about 15 to 25 wt % ethylene/α-olefin-polyethylene block copolymer; and
about 5 to 15 wt % acid-modified ethylene/α-olefin copolymer; and
the polymer composite comprises
(B) about 125 to 175 parts by weight magnesium hydroxide; and
(C) about 40 to 80 parts by weight of the antimony compound, which comprises antimony trioxide.

10. The polymer composite of claim 9, wherein an sheathing material formed from the composition has a tensile strength before aging of at least about 9 MPa (1300 lbf/in$^2$) (as determined pursuant to UL 2556 (12 Mar. 2013) Clause 4.2 and UL 1581:2011 Table 50.134).

11. The polymer composite of claim 9, wherein an sheathing material formed from the composition has an elongation before aging of at least about 110% (as determined pursuant to UL 2556 (12 Mar. 2013) Clause 4.2 and UL 1581:2011 Table 50.134).

12. The polymer composite of claim 9, wherein a sheathing material formed from the composition has a decrease in tensile strength after accelerated aging in air for 7 days at 121° C. of no more than 30% (as determined pursuant to as determined pursuant to UL 2556 (12 Mar. 2013) Clause 4.2 and UL 1581:2011 Table 50.134).

13. The polymer composite of claim 9, wherein a sheathing material formed from the composition has a decrease in elongation after accelerated aging air for 7 days at 121° C. of no more than 30% (as determined pursuant to as determined pursuant to UL 2556 (12 Mar. 2013) Clause 4.2 and UL 1581:2011 Table 50.134).

14. The polymer composite of claim 9, wherein a sheathing material formed from the composition has a limiting oxygen index of at least about 32% (as determined pursuant to as determined pursuant to ASTM D 2683).

15. The polymer composite of claim 9, wherein a sheathing material formed from the composition has a low temperature brittleness value of no more than about −15° C. (as determined pursuant to ASTM D 746).

16. The polymer composite of claim 9, wherein a jacket material formed from the composition and applied as a jacket over multipair PE/PP insulated copper conductors passes the Underwriter's Laboratory ("UL") VW-1 flame test as described in UL 2556 (12 Mar. 2013) clause 9.4.

17. The polymer composite of claim 9, wherein a sheathing material formed from the composition and applied as a jacket over multipair PE/PP insulated copper conductors passes the UL vertical tray flame test method 2 (FT4) as descried in UL 2556 (12 Mar. 2013) clause 9.6.

18. The polymer composite of claim 9, wherein a sheathing material formed from the composition has a melt flow index of at least about 15 g/10 min measured at 190° C., 21.6 kg (as determined pursuant to ASTM D 2683).

19. A halogen free, polymer composite comprising
about 15 to 25 wt % olefin/unsaturated ester copolymer;
about 5 to 15 wt % olefin (co)polymer, which comprises ethylene/α-olefin copolymer and/or olefin block copolymer;
zero to about 5 wt % acid-modified polyolefin;
about 35 to 55 wt % hydrated metal oxide flame-retardant; and
about 15 to 30 wt % antimony compound.

20. The polymer composite of claim 19, comprising
(A) about 15 to 25 wt % ethylene/vinyl acetate copolymer,
(B) about 3 to 10 wt % ethylene/α-octene copolymer,
(C) about 5 to 10 wt % ethylene/α-olefin-polyethylene block copolymer,
(D) about 1 to 5 wt % acid-modified ethylene/α-olefin copolymer;

(E) about 35 to 55 wt % hydrated magnesium oxide; and
(F) about 15 to 30 wt % antimony trioxide.

21. A halogen free, polymer composite comprising
(A) 100 parts by weight polymer material, which includes
about 50 to 65 wt % olefin/unsaturated ester copolymer;
about 25 to 45 wt % ethylene/α-olefin copolymer and/or ethylene/α-olefin-polyethylene block copolymer; and
zero to about 15 wt % acid-modified polyolefin;
(B) about 125 to 175 parts by weight hydrated magnesium oxide flame-retardant; and
(C) about 40 to 100 parts by weight antimony compound;
wherein the total amount of polymeric material makes up about 25 to 40 wt % of the composite.

22. The polymer composite of claim 21, wherein the polymer material comprises
about 50 to 65 wt % ethylene/vinyl acetate copolymer;
about 10 to 20 wt % ethylene/α-octene copolymer;
about 15 to 25 wt % ethylene/α-octene-HDPE block copolymer; and
zero to about 15 wt % maleic acid graft-modified ethylene/propene copolymer;
and the polymer composite comprises
(B) about 125 to 175 parts by weight magnesium hydroxide having an average particle size of no more than about 2 microns; and
(C) about 40 to 80 parts by weight antimony trioxide.

* * * * *